Patented May 9, 1933

1,908,571

UNITED STATES PATENT OFFICE

FRITZ STRAUB AND HANS MAYER, OF BASEL, SWITZERLAND, ASSIGNORS TO THE FIRM OF SOCIETY OF CHEMICAL INDUSTRY IN BASLE, OF BASEL, SWITZERLAND

AZO DYESTUFFS CONTAINING CHROMIUM AND PROCESS OF MAKING SAME

No Drawing  Application filed November 28, 1930, Serial No. 498,904, and in Switzerland December 18, 1929.

The present invention relates to new azo-dyestuffs containing chromium. It comprises the process of making these dyestuffs, the dyestuffs themselves and the material dyed with the new products.

According to this invention azo-dyestuffs containing groups capable of being chromed are treated with basic chromium sulfates. As dyestuffs there may be used those which contain in ortho-position to at least one —N=N—bridge at least one hydroxyl- or carboxyl-group, i. e. such a group which, in combination with an azo-bridge, renders the dyestuff capable of binding chromium, and also those which contain at least once the grouping ortho-hydroxy-carboxyl, such as is characteristic of the salicylic acid derivatives.

The process can be carried out both with poly-azo-dyestuffs and with mono-azo-dyestuffs of the general formula

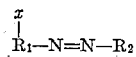

wherein $R_1$ represents an aryl radicle, such as for example a benzene or naphthalene radicle, $R_2$ a radicle of a coupling component, and $x$ such a group standing in ortho-position to the —N=N—bridge, which, in combination with this —N=N—bridge, renders the dyestuff capable of binding chromium.

As coupling components there may be used all those which come into consideration for the production of azo-dyestuffs, such for example as arylamines, phenols, as also compounds of which the carbon atom capable of coupling belongs to a heterocyclic ring or to an open chain. The former is for example the case with pyrazolones, hydroxyquinolines and barbituric acids, the latter for instance with the acetoacetic acid derivatives and the benzoyl-aceto-o-carboxylic acids.

The invention leads to a process which is cheaper in operation than when the known chroming methods are used, in case of which by the use of chromium salts of inorganic acids a complete chromation can only be effected by adding an acid binding agent, such as for example sodium acetate, which is rendering the process more expensive.

The products which can be obtained are suitable, for example, for dyeing animal fibres like wool, natural and loaded silk and leather; also fibres of vegetable origin, such as cotton or fibres and other goods made from regenerated or altered cellulose. They are also suitable for coloring varnishes made from neutral and artificial resins, for instance from condensation products of phenol formaldehyde or urea formaldehyde, or from cellulose derivatives.

The following examples illustrate the invention, the parts being by weight:—

Example 1

42.2 parts of the dyestuff of the formula

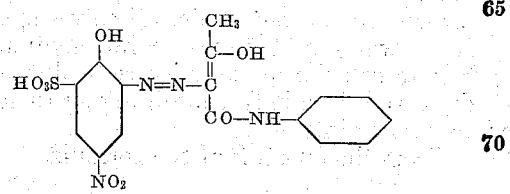

obtained from diazotized 4-nitro-2-amino-1-phenol-6-sulfonic acid and aceto-acetic acid anilide are dissolved in 1500 parts of water. The solution is heated to boiling and then boiled for 15 hours in a reflux apparatus with addition of 72 parts of a solution of chromium sulfate containing 8.4 parts of $Cr_2O_3$ and 16.1 parts of sulfuric acid. By this operation the chromium compound produced is in greater part precipitated and the remainder separates on cooling. The compound is filtered and dried at a moderate temperature. This dyestuff is a brown yellow powder which dissolves somewhat sparingly in water but easily on addition of some sodium carbonate. In a bath containing sulfuric acid it dyes wool fast yellow tints.

From the dyestuff of the formula

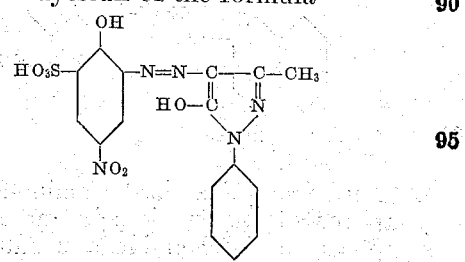

obtained from diazotized 4-nitro-2-amino-1- phenol-6-sulfonic acid and 1-phenyl-3-methyl-5-pyrazolone there is obtained in like manner a chromium compound which dyes wool in a bath containing sulfuric acid fast yellowish orange tints.

*Example 2*

50.3 parts of the dyestuff of the formula

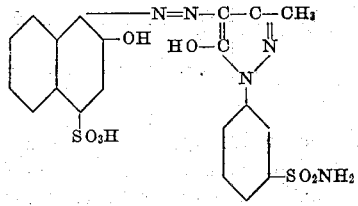

obtained from diazotized 1-amino-2-hydroxynaphthalene-4-sulfonic acid and 1-(meta-sulfamido-phenyl)-3-methyl-5-pyrazolone are dissolved in 1500 parts of boiling water and the solution is boiled for 20 hours in a reflux apparatus, with addition of a quantity of a chromium sulfate solution corresponding with 8.4 parts of $Cr_2O_3$ and 16.1 parts of sulfuric acid. The chromium compound separates in crystalline condition. It is removed from the liquor and when dry is a brown red powder, which dissolves sparingly in water and freely in hot sodium carbonate solution to a bluish-red solution. It dyes wool in a bath containing sulfuric acid fast rose tints.

From the dyestuff of the formula

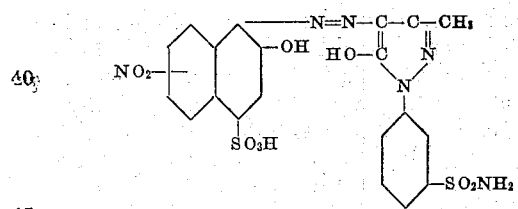

obtained from nitrated 1-diazo-2-hydroxynaphthalene-4-sulfonic acid and 1-(meta-sulfaminophenyl)-3-methyl-5-pyrazolone there is obtained in analogous manner the chromium compound which dyes yellowish red, and from the dyestuff of the formula

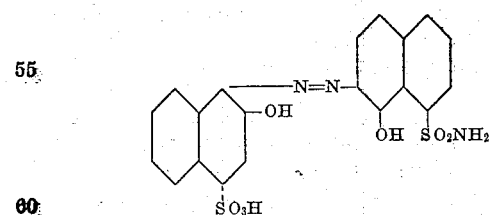

obtained from diazotized 1-amino-2-hydroxynaphthalene-4-sulfonic acid and 1-hydroxynaphthalene-8-sulfamide a product which dyes greenish blue.

*Example 3*

A mixture of 45.4 parts of the dyestuff of the formula

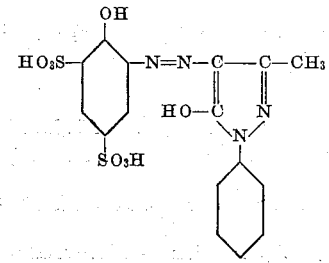

obtained from diazotized 2-amino-1-phenol-4:6-disulfonic acid and 1-phenyl-3-methyl-5-pyrazolone, 72 parts of a neutral chromium sulfate solution, containing 11.7 parts of $Cr_2O_3$, and 500 parts of water, is boiled and kept boiling for 15 hours. It is then made feebly alkaline with sodium carbonate, filtered from some chromium hydroxide which has separated and the filtrate containing the dyestuff is evaporated to dryness in a vacuum. The chromium compound thus formed is very easily soluble in water and dyes wool in a bath containing sulfuric acid very level orange tints.

In like manner there is obtained, for example, from the dyestuff of the formula

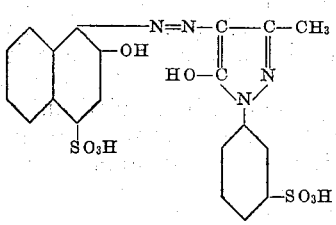

obtained from diazotized 1-amino-2-hydroxynaphthalene-4-sulfonic acid and 1-(meta-sulfophenyl)-3-methyl-5-pyrazolone a freely soluble chromium compound which dyes rose tints.

*Example 4*

47.4 parts of the dyestuff of the formula

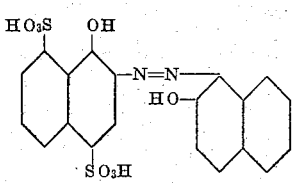

obtained from diazotized 2-amino-1-hydroxynaphthalene-4:8-disulfonic acid and β-naphthol are dissolved in 1000 parts of water and the solution is heated to boiling for 20 hours in a reflux apparatus with addition of a quantity of a basic chromium sulfate containing 8.4 parts of $Cr_2O_3$ and 5.4 parts of sulfuric acid. The reddish blue solution thus obtained is made feebly alkaline with sodium carbonate, filtered from some chromium hydroxide which has separated and the filtrate evaporated to dryness. The chromium compound thus obtained is a blue powder easily soluble in water and dyeing wool in a bath containing sulfuric acid reddish blue tints.

In this case the basicity of the chromium sulfate may be varied within wide limits without preventing the formation of the blue chromium compound. Even in the absence of free sulfuric acid, for instance by using an acid chromium sulfate containing 1 molecular proportion of $Cr_2O_3$ to 4 molecular proportions of sulfuric acid, the chroming proceeds smoothly and leads to the same chromium compound.

*Example 5*

39.4 parts of the dyestuff of the formula

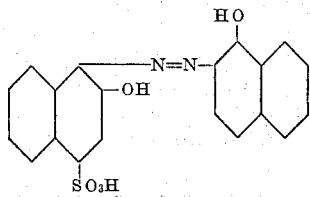

obtained from diazotized 1-amino-2-hydroxynaphthalene-4-sulfonic acid and α-naphthol are dissolved in 2000 parts of boiling water. Then the solution is heated to boiling for 24 hours with addition of 15.2 parts of $Cr_2O_3$ in the form of chromium sulfate containing one molecular proportion of $Cr_2O_3$ to 2½ molecular proportions of sulfuric acid; the chromium compound formed is then salted out, filtered and dried at a moderate temperature. It is somewhat sparingly soluble in water to a greenish blue solution and in sodium carbonate solution to a reddish-blue solution. It dyes wool in a bath containing mineral acid fast greenish blue tints.

Instead of the aforesaid dyestuff made from α-naphthol, the corresponding product from β-naphthol may be used and also a somewhat more basic chromium sulfate (for instance $1Cr_2O_3 + 2H_2SO_4$); in this case also a chromium compound dyeing reddish blue is obtained.

*Example 6*

A mixture of 45.2 parts of the dyestuff of the formula

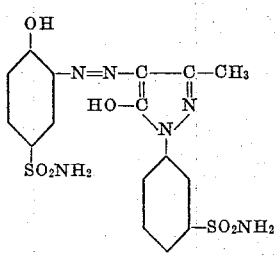

obtained from diazotized 2-amino-1-phenol-4-sulfamide and 1-(meta-sulfamido-phenyl)-3-methyl-5-pyrazolone and 2000 parts of water is boiled and then heated for 12 hours in an enamelled autoclave having a stirrer to 115–120° C. with addition of a quantity of a solution of chromium sulfate corresponding with 9 parts of $Cr_2O_3$ and 17.5 parts of sulfuric acid; the dyestuff, which is thus obtained as a precipitate, is filtered and dried. It dissolves sparingly in water and freely in hot sodium carbonate solution and dyes wool in a bath containing sulfuric acid fast reddish orange tints.

*Example 7*

38.8 parts of the dyestuff of the formula

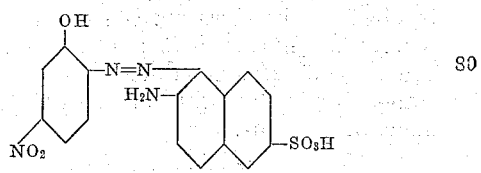

obtained from diazotized 5-nitro-2-amino-1-phenol and 2-naphthyl-amine-6-sulfonic acid are dissolved in 1500 parts of water and the solution is heated for 10 hours in an enamelled autoclave having a stirrer to 115–120° C. with addition of a quantity of a chromium sulfate solution corresponding with 9 parts of $Cr_2O_3$ and containing one molecular proportion of $Cr_2O_3$ to 1½ molecular proportions of $H_2SO_4$. The chromium compound thus completely precipitated is removed from the liquor and converted into a form freely soluble in water by dissolving it in caustic soda solution, neutralizing the liquor with acetic acid and salting out. The dry dyestuff is a dark blue-grey powder which dissolves in water to a bluish green solution. In a bath containing sulfuric acid it dyes wool fast bluish green tints.

*Example 8*

14.4 parts of the dyestuff of the formula

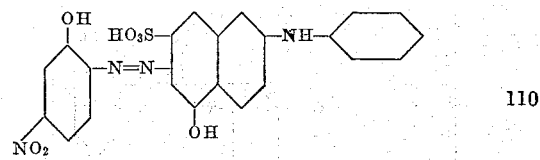

obtained from diazotized 5-nitro-2-amino-1-phenol and 2-(phenyl-amino)-5-hydroxynaphthalene-7-sulfonic acid are dissolved in 1500 parts of water and the solution is heated for 15 hours in an enamelled autoclave having a stirrer to 125–130° C. with addition of 9 parts of crystallized chromium sulfate containing 31.9 per cent. of $Cr_2O_3$. The insoluble chromium compound thus formed is filtered and converted into a form soluble in water by dissolution in caustic soda solution as described in Example 7. It is a dark blue powder, soluble in water to a greenish blue solution and in sodium carbonate solution to a reddish blue solution. It dyes wool in an acid bath greenish blue tints, and cotton or regenerated cellulose, such as viscose silk, in a neutral or feebly alkaline bath also greenish blue tints.

The operation of dyeing with dyestuffs of this invention is illustrated by the following examples.

*Example 9*

The dye-bath is prepared with 3 per cent. of sulfuric acid of 66° Bé. (calculated on the weight of the goods) and wool is handled in the bath for 10–15 minutes at 60° C. The thoroughly dissolved dyestuff is then added and dyeing continued for ½ hour at 60° C.; the bath is then gradually heated to boiling, whereupon a further 5 per cent. of sulfuric acid of 66° Bé. is added and boiling continued for ½–¾ hour for complete development of the tint.

*Example 10*

A dye-bath is prepared with 2 parts of the chromiferous dyestuff and 50 parts of Glauber's salt or 30 parts of common salt. 100 parts of cotton are entered at 60–70° C., the bath is heated to boiling in the course of ¼ hour and dyeing is then continued for ½–¾ hour. The usual rinsing and drying follow. It is also possible to dye in a feebly alkaline bath or a feebly acid bath.

*Example 11*

For making colored nitrocellulose varnishes there are dissolved in 1000 parts of the otherwise finished varnish 4–5 parts of the chromiferous dyestuff. The liquid thus obtained when applied in the form of a thin layer on various supports (metal, glass, leather, ceramic ware, wood, celluloid, silk or the like) leaves on drying a transparent coating, the color of which is fast to light. By incorporating a suitable substance the transparent varnish can be converted into matt varnish or a covering varnish.

In the following table some members of the large class of dyestuffs are named with which the new chroming process may be carried out:—

| No. | Formula of the unchromed dyestuff | Chroming agent | Chromated dyestuff | |
|---|---|---|---|---|
| | | | Color of the powder | Shade of the dyeing |
| 1 | 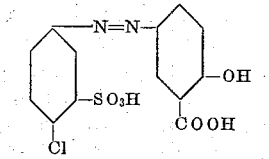 | Neutral chromium sulfate | Yellow | Greenish yellow |
| 2 | 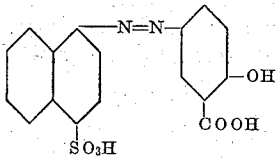 | Do | Yellow orange | Yellow |
| 3 | 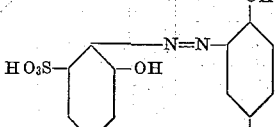 | Do | Dark brown | Brown |
| 4 | 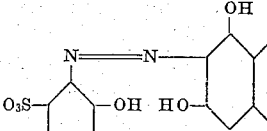 | Do | Red brown | Bordeaux |
| 5 | 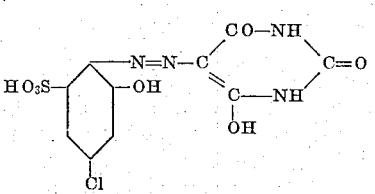 | Basic chromium sulfate | Orange | Orange |

1,908,571

| No. | Formula of the unchromed dyestuff | Chroming agent | Chromated dyestuff | |
|---|---|---|---|---|
| | | | Color of the powder | Shade of the dyeing |
| 6 | 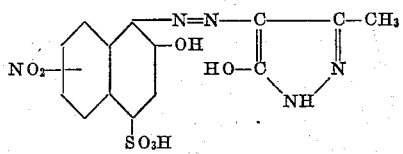 | Neutral chromium sulfate | Red brown | Red |
| 7 | 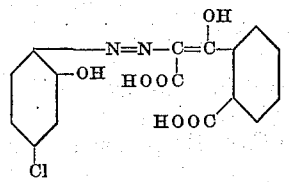 | Do | Green black | Green |
| 8 | 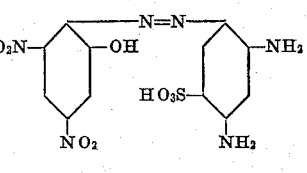 | Do | Dark brown | Brown |
| 9 | 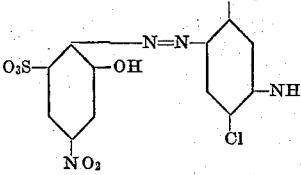 | Acid chromium sulfate | Dark brown | Brown |
| 10 | 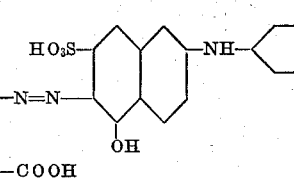 | Neutral chromium sulfate | Dark | Violet |
| 11 | 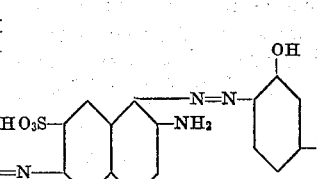 | Do | Dark | Green |
| 12 | 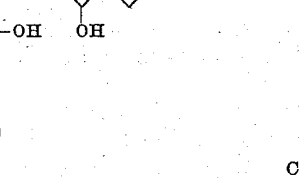 | Do | Dark | Grey |

What we claim is:—

1. Process for the production of dyestuffs containing chromium, consisting in treating azo-dyestuffs which contain groups capable of being chromed, with basic chromium sulfates.

2. Process for the production of dyestuffs containing chromium, consisting in treating azo-dyestuffs which contain in ortho-position to at least one $-N=N-$ bridge at least one group which, in combination with an $-N=N-$ bridge, renders the dyestuff capable of binding basic chromium, with basic chromium sulfates.

3. Process for the production of dyestuffs containing chromium, consisting in treating azo-dyestuffs of the general formula

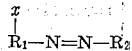

wherein $R_1$ represents an aryl radicle, $R_2$ the radicle of a coupling component, and $x$ such a group standing in ortho-position to the $-N=N-$ bridge which, in combination with this $-N=N-$ bridge, renders the dyestuff capable of binding basic chromium, with basic chromium sulfates.

4. Process for the production of dyestuffs containing chromium, consisting in treating azo-dyestuffs of the general formula

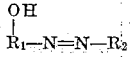

wherein $R_1$ represents an aryl radicle, $R_2$ the radicle of a coupling component, and the hydroxyl group of the aryl radicle $R_1$ stands in ortho-position to the $-N=N-$ bridge, with basic chromium sulfates.

5. Process for the production of dyestuffs containing chromium, consisting in treating azo-dyestuffs of the general formula

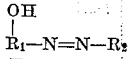

wherein $R_1$ and $R_2$ represent aryl radicles, and the hydroxyl group of the aryl radicle $R_1$ stands in ortho-position to the $-N=N-$ bridge, with basic chromium sulfates.

6. Process for the production of dyestuffs containing chromium, consisting in treating azo-dyestuffs of the general formula

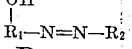

wherein $R_1$ and $R_2$ represent naphthalene radicles, and the hydroxyl group of the naphthalene radicle $R_1$ stands in ortho-position to the $-N=N-$ bridge, with basic chromium sulfates.

7. Process for the production of a dyestuff containing chromium, consisting in treating the azo-dyestuff of the formula

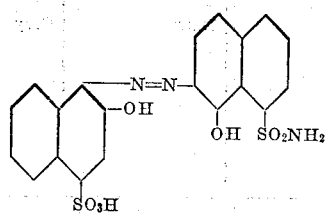

with a basic chromium sulfate.

8. Process for the production of dyestuffs containing chromium, consisting in treating azo-dyestuffs of the general formula

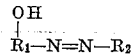

wherein $R_1$ represents an aryl radicle, $R_2$ the radicle of such a coupling component of which the carbon atom linked with the $-N=N-$ bridge belongs to a heterocyclic ring, and the hydroxyl-group of the aryl radicle $R_1$ stands in ortho-position to the $-N=N-$ bridge, with basic chromium sulfates.

9. Process for the production of dyestuffs containing chromium, consisting in treating azo-dyestuffs of the general formula

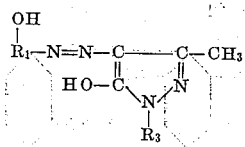

wherein $R_1$ and $R_3$ represent aryl radicles, and the hydroxyl group of the aryl radicle $R_1$ stands in ortho-position to the $-N=N-$ bridge, with basic chromium sulfates.

10. Process for the production of a dyestuff containing chromium, consisting in treating the azo-dyestuff of the formula

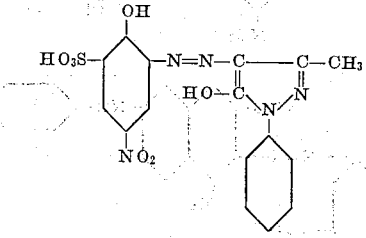

with a basic chromium sulfate.

11. Process for the production of dyestuffs containing chromium, consisting in treating azo-dyestuffs of the general formula

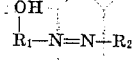

wherein $R_1$ represents an aryl radicle, $R_2$ the radicle of an aceto-acetic-acid, and the hydroxyl group of the aryl radicle $R_1$ stands in ortho-position to the $-N=N-$ bridge, with basic chromium sulfates.

12. Process for the production of a dyestuff containing chromium, consisting in treating the azo-dyestuff of the formula

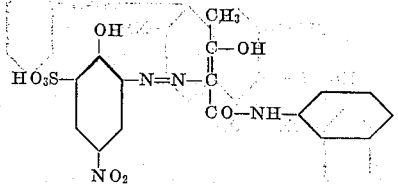

with a basic chromium sulfate.

13. The chromium compounds of azo-dyestuffs obtained by chroming azo-dyestuffs, in which the groups capable of being chromed contain bound basic chromium, with basic chromium sulfates, which products form yellow to orange to red to violet to blue to green to black powders which dye the fiber yellow to orange to red to violet to blue to green to black tints.

14. The chromium compounds of azo-dyestuffs obtained by chroming azo-dyestuffs, which contain in ortho-position to at least one —N=N— bridge at least one group which, in combination with an —N=N— bridge, contain bound basic chromium, with basic chromium sulfates, which products form yellow to orange to red to violet to blue to green to black powders which dye the fiber yellow to orange to red to violet to blue to green to black tints.

15. The chromium compounds of azo-dyestuffs of the general formula

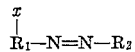

wherein $R_1$ stands for an aryl radicle, $R_2$ for the radicle of a coupling component, and $x$ for a group standing in ortho-position to the —N=N—bridge which, in combination with this —N=N—bridge, contains bound chromium, and obtained by chroming these azo-dyestuffs, with basic chromium sulfates, which products form yellow to orange to red to violet to blue to green to black powders which dye the fiber yellow to orange to red to violet to blue to green to black tints.

16. The chromium compounds of azo-dyestuffs of the general formula

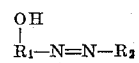

wherein $R_1$ stands for an aryl radicle, $R_2$ for the radicle of a coupling component, and the hydroxyl group standing in ortho-position to the —N=N—bridge, in combination with this —N=N—bridge, contains bound chromium, and obtained by chroming these azo-dyestuffs, with basic chromium sulfates, which products form yellow to orange to red to violet to blue to green to black powders which dye the fiber yellow to orange to red to violet to blue to green to black tints.

17. The chromium compounds of azo-dyestuffs of the general formula

wherein $R_1$ and $R_2$ stand for aryl radicles and the hydroxyl group standing in ortho-position to the —N=N—bridge, in combination with this —N=N—bridge, contains bound chromium, and obtained by chroming these azo-dyestuffs, with basic chromium sulfates, which products form yellow to orange to red to violet to blue to green to black powders which dye the fiber yellow to orange to red to violet to blue to green to black tints.

18. The chromium compounds of azo-dyestuffs of the general formula

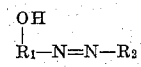

wherein $R_1$ and $R_2$ stand for naphthalene radicles and the hydroxyl group standing in ortho-position to the —N=N—bridge, in combination with this —N=N—bridge, contains bound chromium, and obtained by chroming these azo-dyestuffs, with basic chromium sulfates, which products form yellow to orange to red to violet to blue to green to black powders which dye the fiber yellow to orange to red to violet to blue to green to black tints.

19. The chromium compound of the azo-dyestuff of the formula

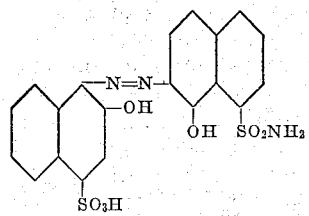

wherein the hydroxyl group of the naphthalene nucleus containing a sulfo group, in combination with the —N=N—bridge, contains bound chromium, and obtained by chroming these azo-dyestuffs, with a basic chromium sulfate, which product forms a black powder dyeing the fiber greenish-blue tints.

20. The chromium compounds of azo-dyestuffs of the general formula

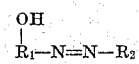

wherein $R_1$ stands for an aryl radicle, $R_2$ for the radicle of such a coupling component the carbon atom of which connected with the —N=N—bridge belongs to a heterocyclic ring, and wherein the hydroxyl group of the aryl radicle $R_1$ standing in ortho-position to the —N=N—bridge, in combination with this —N=N—bridge, contains bound chromium, and obtained by chroming these azo-dyestuffs, with basic chromium sulfates, which products form yellow to orange to red powders which dye the fiber yellow to orange to red tints.

21. The chromium compounds of azo-dyestuffs of the general formula

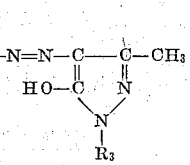

wherein $R_1$ and $R_3$ stand for aryl radicles and wherein the hydroxyl group of the aryl radicle $R_1$ standing in ortho-position to the —N=N—bridge, in combination with this —N=N— bridge, contains bound chromium, and obtained by chroming these azo-dyestuffs, with basic chromium sulfates, which products form yellow to orange to red powders which dye the fiber yellow to orange to red tints.

22. The chromium compound of the azo-dyestuff of the formula

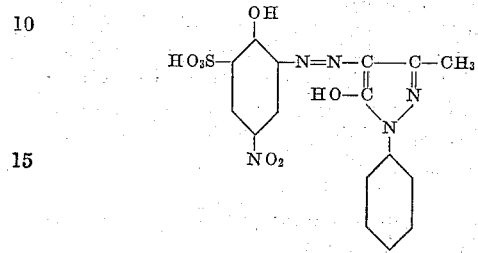

wherein the hydroxyl group of the benzene nucleus, in combination with the —N=N— bridge, contains bound chromium, and obtained by chroming this azo-dyestuff with a basic chromium sulfate, which product forms a yellowish-orange powder dyeing the fiber yellowish-orange tints.

23. As new products the chromium compounds of azo-dyestuffs of the general formula

wherein $R_1$ stands for an aryl radicle, $R_2$ for the radicle of an aceto-acetic acid, and wherein the hydroxyl group of the aryl radicle $R_1$ standing in ortho-position to the —N=N— bridge, in combination with this —N=N— bridge, contains bound chromium, and obtained by chroming these azo-dyestuffs, with basic chromium sulfates, which products form yellow to orange powders which dye the fiber yellow to orange tints.

24. The chromium compound of the azo-dyestuff of the formula

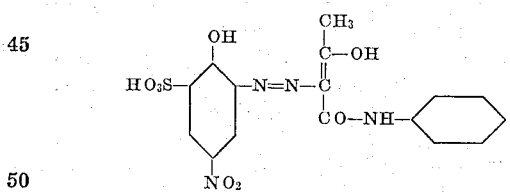

wherein the hydroxyl group of the benzene nucleus, in combination with the —N=N— bridge, contains bound chromium, and obtained by chroming this azo-dyestuff with a basic chromium sulfate, which product forms a yellow powder dyeing the fiber yellow tints.

In witness whereof we have hereunto signed our names this 17th day of November, 1930.

FRITZ STRAUB.
HANS MAYER.